Sept. 8, 1964 D. DANIELSEN ETAL 3,148,334
PULSE SEQUENCE VERIFIER CIRCUIT WITH DIGITAL LOGIC GATES
FOR DETECTING ERRORS IN MAGNETIC RECORDING CIRCUITS
Filed Jan. 23, 1962 2 Sheets-Sheet 1

INVENTORS: D. DANIELSEN
S. B. JUDLOWE
BY Lucian C. Canepa
ATTORNEY

INVENTORS: D. DANIELSEN
S. B. JUDLOWE
BY Lucian C. Canepa
ATTORNEY

United States Patent Office 3,148,334

Patented Sept. 8, 1964

3,148,334

PULSE SEQUENCE VERIFIER CIRCUIT WITH DIGITAL LOGIC GATES FOR DETECTING ERRORS IN MAGNETIC RECORDING CIRCUITS

Daniel Danielsen, Bloomingdale, and Stephen B. Judlowe, Murray Hill, N.J., assignors to Bell Telephone Laboratories, Incorporated, New York, N.Y., a corporation of New York Filed Jan. 23, 1962, Ser. No. 168,186

15 Claims. (Cl. 328—92)

This invention relates to magnetic recording and, more specifically, to a circuit which verifies the recording of binary digits on magnetic tape.

Various methods for storing binary information on magnetic tape have been employed which rely on the hysteresis property of a ferromagnetic tape. In general, the recording is accomplished by a recording head which is inductively coupled to the tape. For binary operation, the recording head is driven between two distinct and different magnetization states, typically by coupling to the head a recording winding which is supplied by a bistable current source. The signal recorded on the tape thereby becomes a function of the magnetization condition of the recording head which is, in turn, dependent upon the current supplied to the recording winding by the current source.

In many recording applications it is desirable to authenticate the actual storage on the tape of the desired binary information. The most reliable method to accomplish this confirmation is to read back the tape and check the read-out information against the original intelligence for any discrepancies which might have transpired. This method of corroboration suffers several disadvantages as it is necessarily slow, cumbersome, expensive, and, additionally, there can usually be no check made until the entire tape has been recorded.

Other verification methods have been employed which utilize redundant recording heads, recording windings and the like, thereby employing an unnecessary duplication of components in the writing circuit.

It is an object of the present invention to verify the magnetic recording of binary digits.

More specifically, it is an object of the present invention to provide a write circuit verifier which indicates a failure of a magnetic recording write circuit to respond to a record condition for a binary digit.

Another object of the present invention is the provision of control circuits which detect an omission of a pulse from one of two pulse sources which normally supply alternate pulses.

A further object of the present invention is the provision of control circuits, both asynchronous and synchronous, which are reliable, capable of a rapid cycling time and flexible in application.

These and other objects of the present invention are realized in a specific illustrative write circuit verifier which may be employed in the well known non-return to zero method of binary recording in which a change in the hysteresis remanent polarity and a continuous magnetization correspond, respectively, to stored binary "1" and "0" conditions.

A bipolar current writing source is employed in the recording process. This source changes its output current polarity, and thereby also a recording flux polarity, in response to each binary "1" pulse supplied by a recording pulse source. The change in the conduction condition of the writing current source is detected by a square loop magnetic core which has coupled thereto a winding with associated diodes to yield a positive signal delayed from the recording binary "1" pulse in response to the core being switched in either direction. The output of the core winding and also the output from the recording pulse source are connected to the inputs of an OR logic gate whose output drives a single input flip-flop arrangement which changes its stable state in response to each consecutive energization of its input terminal. An output of the flip-flop and also the output of the pulse source are connected to different inputs of an AND logic gate.

During normal circuit operation a pulse from the pulse source changes the recording current polarity and also changes the state of the flip-flop such that the output terminal thereof which is connected to the AND gate is at a relatively high potential. This flip-flop output terminal was initially set in a relatively low potential condition thereby disabling the AND gate and preventing an output from resulting when the other AND gate input was energized by the pulse source.

If the recording current actually does change polarity in response to the pulse supplied by the pulse source thereby storing a binary "1" on the magnetic tape, as required for proper circuit functioning, the output from the detecting core winding resets the flip-flop and the circuit reverts to its initial condition.

Should a malfunction occur, however, and the recording current remain unchanged, the flip-flop is not reset and the AND logic gate remains enabled. The next "1" pulse from the pulse source will switch the conditioned AND gate and an output will result, thereby indicating the malfunction.

In addition to the above-described asynchronous arrangement, other asynchronous recording write circuit verifying embodiments of the principles of the present invention, and also a synchronous arrangement, are presented hereinafter.

It is thus a feature of the present invention that a write circuit verifier include a pulse source, a switching arrangement and an AND logic gate responsive to both the pulse source and the switching arrangement.

It is another feature of the present invention that a control circuit include an independent pulse source, a dependent pulse source supplying pulses in one to one correspondence with the output of the independent source and delayed therefrom, an AND gate with one input terminal connected to the independent pulse source and a second input terminal supplied by a switching arrangement which supplies a relatively high or low potential depending upon whether the independent or dependent pulse source, respectively, supplied the last pulse.

A complete understanding of the present invention and of the above and other features, variations and advantages thereof may be gained from a consideration of the following detailed description of four illustrative embodiments thereof presented hereinbelow in connection with the accompanying drawing, in which.

Figure 1:
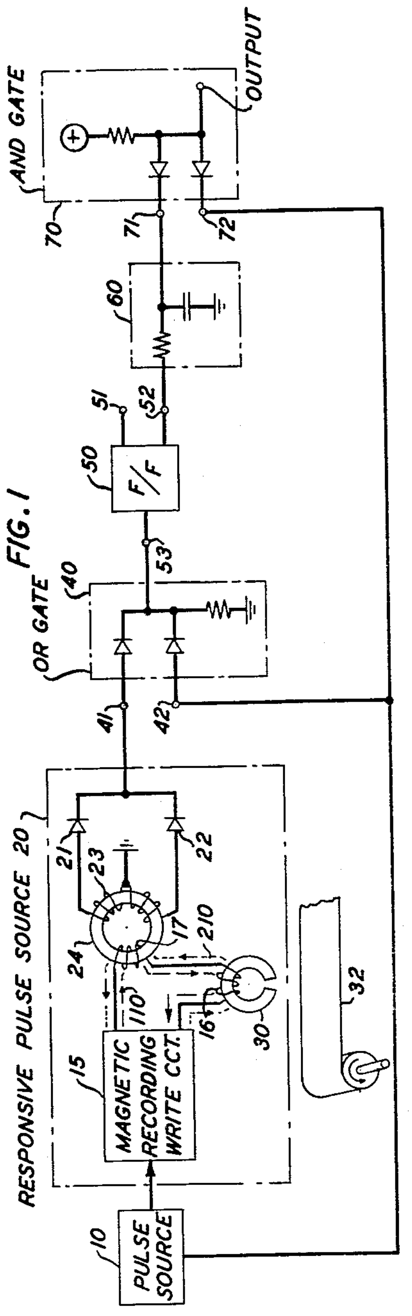
FIG. 1 is a schematic diagram of a specific illustrative write circuit verifier which embodies the principles of the present invention.

Referring now to FIG. 1, there is shown a specific illustrative asynchronous write circuit verifier which includes a magnetic recording write circuit 15 of the type disclosed in a copending application of D. Danielsen, Serial No. 161,152, filed December 21, 1961. A pulse source 10 is connected to the input of the write circuit 15 to cause a reversal in polarity of the recording current supplied by the recording current source 15 upon each occurrence of a pulse from the source 10. The recording current flows through a winding 16 on recording head 30 which head is inductively coupled to a magnetic tape 32, and also, through input winding 17 inductively wound on detecting core 24 which is composed of a square loop ferromagnetic material. An output winding 23 with a grounded center tap is also inductively wound around the core 24 with each of its ends connected to an anode of a diode 21 or 22. The cathodes of the diodes are electrically joined and further connected to an input terminal 41 of an OR logic gate 40. The core 24, winding 23 and diodes 21 and 22 are employed to generate a pulse upon each occurrence of a pulse supplied by the source 10, and delayed therefrom.

The OR gate 40 has a second input terminal 42 which is connected to the output of the pulse source 10. The output of the OR gate 40 is connected to input terminal 53 of a bistable flip-flop arrangement 50 which includes output terminals 51 and 52. An integrating network 60 is inserted between the output terminal 52 of the flip-flop 50 and an input terminal 71 of an AND logic gate 70 which includes a second input terminal 72 connected to the output of the pulse source 10.

Let us assume that initially a recording current, following the dashed path 110 illustrated in FIG. 1, is flowing out of the upper terminal of the recording write circuit 15 and, additionally, that terminals 51 and 52 of the flip-flop 50 are respectively in a relatively high and a relatively low potential condition. The circuit 15 will remain in this state until the pulse source 10, which may advantageously be the output of a recording logic arrangement, supplies a pulse indicating, in the above-described non-return to zero method of recording, that a binary "1" is to be stored on the tape.

Let the pulse source 10 supply a first binary "1" recording pulse. The pulse is transmitted directly to the input terminal 42 of the OR logic gate 40 and input terminal 72 of the AND logic gate 70. As the input terminal 71 of the AND gate 70 is initially in the relatively low potential condition, energization of the input terminal 72 is insufficient to switch the gate 70 and generate an output therefrom. However, the pulse applied to the terminal 42 of the OR gate 40 will be transmitted to the input terminal 53 of the flip-flop 50. In response thereto, the flip-flop 50 will alternate stable states thereby creating a relatively high potential on output terminal 52 which will be transmitted through the integrating network 60 to terminal 71 of the AND gate 70. The integrating network insures that the terminal 71 does not receive a relatively high potential before the pulse from the source 10 applied to the AND gate input terminal 72 has been removed. Should pulses of an extremely short duration be employed, the inherent delay and stray capacity associated with the flip-flop 50 would cause a sufficient delay thereby eliminating the requirement for the network 60.

If the write circuit 15 properly responds to the pulse supplied by the recording pulse source 10, the recording current will reverse polarity and follow the dotted path 210 depicted in FIG. 1 into the upper terminal of the circuit 15. This current reversal will cause the detecting core 24 to switch its remanent polarity thereby inducing a voltage in winding 23 which forward biases the diode 22 causing a positive pulse to appear at the input terminal 41 of the OR gate 40 and thereby also at the input terminal 53 of the flip-flop 50. In response to having its input energized, the flip-flop 50 will again reverse its potential condition, returning output terminal 52 to the relatively low potential state. As the integrating network 60 had prevented the input terminal 71 from reaching a high voltage condition in response to the pulse from the pulse source 10, the circuit reverts to its initial state and will not yield an output upon the next occurrence of a binary "1" pulse. The lack of an output signifies that circuit operation for the preceding record pulse has been correctly performed.

Should an error occur in the recording process such that the recording circuit 15 does not change the recording current polarity responsive to the pulse from the source 10, the flip-flop 50 is not reset, and the relatively high voltage on the output lead 52 is transmitted through the integrator 60, resulting in a relatively high potential on the input terminal 71 thereby enabling the AND gate 70. The next pulse emanating from the source 10 would energize the other input terminal 72 thereby switching the AND gate 70 and yielding an output which indicates that a malfunction has occurred.

Note that a plurality of the circuit elements shown in FIG. 1 have been combined into a circuit block entitled "Responsive Pulse Source 20." In addition to an application in magnetic recording, the inventive arrangements herein disclosed may be employed as control circuits to verify the occurrence of any responsive condition which is capable of generating a pulse. Hence, in the remainder of the drawing a responsive pulse source 20 will be illustrated in lieu of the arrangement depicted in FIG. 1 pursuant to the understanding that any responsive control function may be substituted for the recording detection arrangement which includes the responsive source 20 in FIG. 1.

Figure 1A:
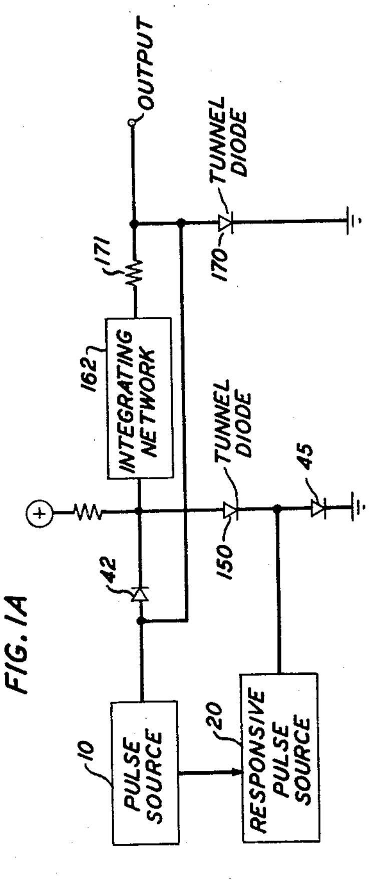
FIG. 1A is an alternate embodiment of the verifier illustrated in FIG. 1.

A second illustrative write circuit verifier, illustrated in FIG. 1A, operates in a somewhat similar manner as the embodiment depicted in FIG. 1. Here, the functions of the OR logic gate 40 and the flip-flop 50 of FIG. 1 are performed by a single tunnel diode 150, and the AND circuit 70 illustrated in FIG. 1 is replaced by a tunnel diode 170. The tunnel diode 150 is biased for bistable operation and performs the combined functions of the OR logic gate and the flip-flop by having the pulse source 10 connected to its anode via diode 42 with the responsive pulse source 20 connected across a conventional asymmetrically conducting diode 45 which is connected in series with the diode 150. The diode 150 will reside on the high or low stable potential portion of its characteristic curve depending upon whether the source 10 or 20, respectively, has last supplied a pulse thereto. The tunnel diode 170 along with its associated series resistor 171 is designed to perform AND logic in that it will not attain the high voltage state unless the tunnel diode 150 is in its high voltage condition and, subsequent thereto, a pulse is received from the pulse source 10 which is directly connected to the anode of the diode 170. The circuit operation of the FIG. 1A arrangement will not be discussed in detail as it identically parallels that described above for the FIG. 1 embodiment.

Figure 2:
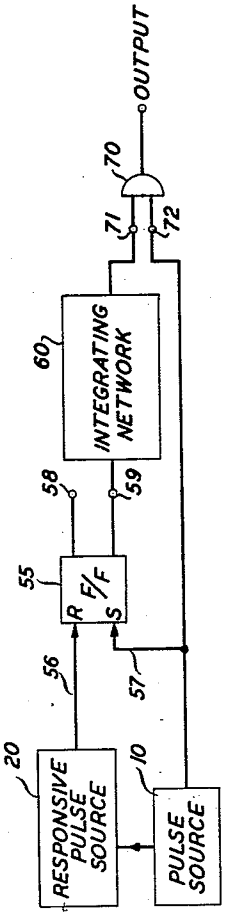
FIG. 2 is a third specific illustrative write circuit verifier which embodies the principles of the present invention.

A third distinct illustrative asynchronous recording write circuit verifier is illustrated in FIG. 2 and employs a two input set-reset flip-flop 55 in place of the single input flip-flop 50 and the OR gate 40 employed in the FIG. 1 embodiment. In the FIG. 2 circuit, the pulse source 10 is connected to the set terminal 57, and the responsive pulse source 20 is connected to the reset terminal 56, of the bistable flip-flop 55. The remainder of the circuit arrangement remains identical to that illustrated in FIG. 1. The set-reset flip-flop 55 is distinuished from the single input flip-flop 50 employed in FIG. 1 in that the two output terminals 58 and 59 included in the flip-flop 55 are in a high potential condition responsive to the energization of the input terminals 56 and 57, respectively.

For normal circuit operation a pulse supplied by the pulse source 10 of the circuit depicted in FIG. 2 energizes the terminal 57 of the flip-flop 55, creating a high potential at the output terminal 59 which is initially assumed to be in a relatively low voltage condition. The terminal 59 is connected to the AND gate 70 through the integrating network 60. This pulse from the source 10, which is also directly supplied to the AND gate, is insufficient to switch the gate 70. If the circuit operates properly, a pulse will be generated by the responsive source 20, delayed from the source 10 pulse, which will energize the reset terminal 56 thereby returning output terminal 59 to a relatively low potential such that the AND gate 70 will remain unable to switch its potential condition in response to the next binary "1" record pulse from the source 10.

Should the circuit malfunction and the source 20 not respond with a pulse, the next subsequent pulse from the source 10 would be sufficient to switch the AND gate 70 which would be enabled due to the relatively high potential supplied to the AND gate input terminal 71 by the integrator 60 from the flip-flop output terminal 59. The output voltage so generated by the AND gate 70 would be indicative of a circuit error.

Figure 3:
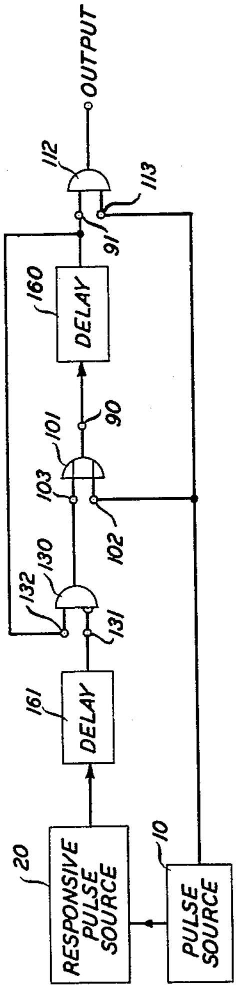
FIG. 3 is a fourth specific illustrative write circuit verifier employing the principles of the present invention.

Each of these circuit arrangements discussed hereinabove has been asynchronous in nature as there was no requirement on the time spacing between any consecutive binary "1" record pulses supplied by the source 10. FIG. 3, however, illustrates a synchronous circuit arrangement which necessarily restricts any pulses supplied by the source 10 to occur at evenly spaced clocked times. It is to be noted at this point that a sequential time spacing is defined as one-half the time between two consecutive "1" pulses supplied by the source 10.

The pulse source 10 shown in FIG. 3 is connected to input terminal 102 of an OR gate 101 and also to an input terminal 113 of an AND gate 112. Output terminal 90 of the OR gate 101 is connected to an input terminal 91 of the AND gate 112 by a delay unit 160. This unit introduces a delay of one sequential time spacing or one pulse period. The responsive pulse source 20 is connected by a delay unit 161 to an inhibited input terminal 131 of an AND gate 130 which contains a second input terminal 132 connected to input terminal 91 of the AND gate 112. The output of the AND gate 130 is connected to an input terminal 103 of the OR gate 101.

Assume that the input terminal 91 is initially in a relatively low potential condition. A pulse from the pulse source 10 will switch the OR gate 101 creating a relatively high voltage at the output terminal 90 while being insufficient to switch the AND gate 112 due to the relatively low potential on its input terminal 91. At the next or second sequential sampling time the relatively high voltage which existed at the output 90 of the OR gate 101 has been transmitted through the delay network 160 to the input terminal 91 of the AND gate 112 and also to the input terminal 132 of the AND gate 130. Again, if the recording write circuit has functioned properly a pulse will be generated by the responsive pulse source 20 and transmitted through delay network 161 to appear at the input terminal 131 of AND gate 130 at this second sequential time. The input 131, however, is inhibited such that no output will be generated by the AND gate 130, and in addition, since neither of the terminals 103 or 102 of the OR gate 101 is energized there will be a relatively low potential at the output 90 of the OR gate 101. One sequential time later, this relatively low voltage will appear at the input terminal 91 of the AND gate 112, thereby resetting the circuit to its initial state and prohibiting any pulse which may be supplied by the pulse source 10 from switching the AND gate 112. The delays 160 and 161 are necessary to delay signals appearing on their inputs until the next clocked time before transmitting these signals to the delay output terminals.

However, if the circuit illustrated in FIG. 3 malfunctions and the responsive pulse source 20 fails to generate a pulse, this lack of a pulse at the inhibited input termnal 131 of the AND gate 130, along with the relatively high potential at the input terminal 132, will switch the AND gate 130. The relatively high potential thereby generated will be transmitted to the input terminal 103 of the OR gate 101 and thereby also to the delay unit 160. If a pulse appears at the next discrete circuit time, both the input terminals 91 and 113 will be energized, switching the AND gate 112 and thereby generating an output signal indicating that an error has occurred.

Should the pulse source 10 generate no pulse at this next time, the high voltage at the input terminal 91 of the AND gate 112 is supplied to the input terminal 132 of the AND gate 130. This gate will be switched as there is no input on the inhibited terminal 131 and subsequently, a voltage appears at the output 90 of the OR gate 101 which will appear one time unit later at the input terminal 91 of the AND gate 112. This sequence will continue until a pulse is generated by the pulse source 10 which will switch the AND gate 112 thereby yielding an output which is indicative of the circuit malfunction.

Additionally, if during operation no pulses are supplied by the pulse source 10, the circuit will retain the proper initial voltage state as the input terminal 91 of the AND gate 112 will have a relatively low voltage applied thereto. Observe that if terminal 91 lacks a relatively high voltage, the AND gate 130 cannot switch states due to a lack of voltage on its input terminal 132. Therefore, since both the terminals 102 and 103 of the OR gate 101 are not activated, a relatively high voltage does not appear at the output 90 of the OR gate 101 to be translated to the terminal 91 at the next sequential interval.

Summarizing, both asynchronous and synchronous switching arrangements have been employed to enable one input of an AND logic gate with a second input terminal of the AND gate connected to a first pulse source. The switching arrangement is responsive to the pulses supplied by the first pulse source for enabling the AND gate and also responsive to a second source of pulses which is dependent upon the first source for disabling the AND gate. The type and nature of the switching arrangement may be varied to contain any desired type of bistable flip-flop arrangement, and in the case of a synchronous circuit, the flip-flop may be eliminated and replaced by appropriate logical building blocks and delay elements associated therewith.

It is to be understood that the above-described arrangements are only illustrative to the application of the present invention. Numerous other arrangements may be devised by those skilled in the art without departing from the spirit and the scope of the present invention. For example, the AND and OR logic gates shown in FIGS. 2 and 3 may be conventional diode configurations of the type shown in FIG. 1 or the AND gates may be tunnel diode AND gates as illustrated in FIG. 1A. Also, the present invention is not limited to the non-return to zero method of recording. Any binary recording system may be employed which utilizes two distinct and different magnetization states. The only circuit modification required is a substitution of a linear core material for the square loop material employed in the detecting core 24 illustrated in FIG. 1.

What is claimed is:

1. In combination, source means including first and second output terminals for respectively supplying thereto a first plurality of pulses and a second plurality of pulses in one-to-one correspondence with said first pulse plurality and delayed therefrom, an AND logic gate including an output terminal and two input terminals, said first terminal of said source means connected to a first input of said AND logic gate, a bistable flip-flop including one input terminal and an output terminal which alternates between a relatively high and a relatively low potential condition responsive to consecutive energization of said input terminal, said flip-flop output terminal connected to the second input of said AND gate, and an OR logic gate including an output terminal connected to the input of said flip-flop and also including two input terminals, said first terminal of said source means connected to one input of said OR logic gate and said second terminal of said source means connected to the other input of said OR logic gate.

2. In combination, a first independent pulse source means, second pulse source means for supplying pulses in one-to-one correspondence with the pulses of said first source means and delayed therefrom, an AND logic gate including an output terminal and two input terminals, said first pulse source means connected to a first input terminal of said AND logic gate, a bistable flip-flop including one input terminal and an output terminal which alternates between a relatively high and a relatively low potential condition responsive to consecutive energizations of said input terminal, said flip-flop output terminal connected to the second input terminal of said AND gate, an OR logic gate including an output terminal connected to the input terminal of said flip-flop and also including two input terminals, said first pulse source means connected to one input terminal of said OR logic gate and said second pulse source means connected to the other input terminal of said OR logic gate, and integrating means inserted between said output terminal of said flip-flop and said second input terminal of said AND gate.

3. A combination as in claim 2 further comprising means connecting said first and second pulse sources, and wherein said second pulse source means is responsive to each pulse supplied by said first pulse source means for generating a pulse delayed in time from said pulse supplied by said first pulse source means.

4. In combination, a first independent pulse source means, second pulse source means for supplying pulses in one-to-one correspondence with the pulses of said first source means and delayed therefrom, an AND logic gate including an output terminal and two input terminals, said first pulse source means connected to a first input terminal of said AND logic gate, a bistable flip-flop including one input terminal and an output terminal which alternates between a relatively high and a relatively low potential condition responsive to consecutive energizations of said input terminal, said flip-flop output terminal connected to the second input terminal of said AND gate, an OR logic gate including an output terminal connected to the input terminal of said flip-flop and also including two input terminals, said first pulse source means connected to one input terminal of said OR logic gate and said second pulse source means connected to the other input terminal of said OR logic gate, integrating means inserted between said output terminal of said flip-flop and said second input terminal of said AND gate, wherein said second pulse source means is responsive to each pulse supplied by said first pulse source means for generating a pulse delayed in time from said pulse supplied by said first pulse source means, and wherein said second pulse source means comprises a recording write circuit for supplying a recording current which changes polarity in response to consecutive pulses supplied by said first independent pulse source means, a magnetic core inductively coupled to said recording circuit, two diodes, a detecting winding inductively coupled to said magnetic core, and a grounded center tap on said winding, one of said diodes having its anode connected to one end of said winding, the other diode having its anode connected to the opposite end of said winding, the catheodes of said diodes being electrically joined and further connected to said OR logic gate.

5. In combination in a magnetic control circuit, bistable means including an input terminal and an output terminal, said output terminal alternating between a relatively high and a relatively low potential condition in response to consecutive energization of said input terminal, an AND logic gate including two input terminals, a first one of said input terminals being connected to said output terminal of said bistable means, an OR logic gate including an output terminal connected to said input terminal of said bistable means and also including a first input terminal connected to the second AND gate input terminal, a second input terminal included in said OR logic gate, a first pulse source and a second pulse source which supplies pulses in one-to-one correspondence with the pulses of said first pulse source and delayed therefrom, said first source connected to said second AND gate input terminal, said second pulse source connected to a second input terminal of said OR logic gate, and integrating means connected between said first input terminal of said AND logic gate and said output terminal of said bistable means.

6. A combination as in claim 5 wherein said bistable means comprises a bistable flip-flop.

7. A combination as in claim 6 further including means for causing said second pulse source to supply a pulse in response to each pulse supplied by said first pulse source.

8. A combination as in claim 7 wherein said second pulse source means comprises a recording write circuit for supplying a recording current which changes polarity in response to consecutive pulses supplied by said first pulse source, a magnetic core inductively coupled to said recording circuit, two diodes, a detecting winding inductively coupled to said magnetic core, and a grounded center tap on said winding one of said diodes having its anode connected to one end of said winding, the other diode having its anode connected to the opposite end of said winding, the cathodes of said diodes being electrically joined and further connected to said first OR logic gate input terminal.

9. In combination, a first independent pulse source means, second pulse source means for supplying pulses in one-to-one correspondence with the pulses of said first source means and delayed therefrom, an AND logic gate including an output terminal and two input terminals, said first pulse source means connected to a first input terminal of said AND logic gate, a set-reset bistable flip-flop which includes set and reset input terminals and an output terminal which is in a relatively high potential condition in response to an energization of said set terminal and a relatively low potential condition responsive to an energization of said reset input terminal, said output terminal of said flip-flop being connected to the second input terminal of said AND logic gate, said first independent pulse source means connected to said set terminal of said flip-flop, said second pulse source means connected to said reset terminal of said flip-flop, and an integrating circuit inserted between said output terminal of said flip-flop and said second input terminal of said AND logic gate.

10. In combination in a magnetic control circuit, bistable means including set and reset input terminals and an output terminal, said output terminal being in a relatively high and a relatively low potential condition in response to said set and said reset input terminals, respectively, being energized, and an AND logic gate including two input terminals, a first one of said AND gate input terminals being connected to said bistable means output terminal, said set terminal of said bistable means being connected to the second input terminal of said AND logic gate, first pulse source means, second pulse source means which supplies pulses in one-to-one correspondence with pulses of said first source means and delayed therefrom, said first pulse source means being connected to said set terminal of said bistable means, said second pulse source means being connected to said reset terminal of said bistable means, and integrating means connected between said output terminal of said bistable means and said first input terminal of said AND gate.

11. A combination as in claim 10 further including means for causing said second pulse means to supply a pulse in response to each pulse supplied by said first pulse means.

12. In combination in a sequential magnetic write circuit verifier, source means including first and second output terminals for respectively supplying thereto a first plurality of pulses and a second plurality of pulses in one-to-one correspondence with said first pulse plurality and delayed therefrom, a first AND logic gate including first and second input terminals, a second AND gate including an output terminal and first and second input terminals, wherein said first input terminals of said first and second AND logic gates are electrically joined, an OR logic gate including first and second input terminals and an output terminal, said output terminal of said second AND gate connected to said first input terminal of said OR logic gate, a delay network connected between the output terminal of said OR logic gate and said first input terminal of said first AND logic gate, said first terminal of said source means connected to said second input terminal of said OR logic gate and to said second input terminal of said first AND logic gate, said second input terminal of said second AND logic gate being inhibited, and a delay network connecting said second terminal of said pulse source means and said inhibited second input terminal of said second AND logic gate.

13. In combination in a magnetic control circuit, an OR logic gate comprising first and second input terminals and an output terminal, a first delay network, first and second AND logic gates comprising first and second input terminals and an output terminal, said second input terminal of said second AND gate being inhibited, said first delay network being connected between said OR gate output terminal and said first input terminal of said first AND gate, said first input terminal of said second AND gate and said first input terminal of said first AND gate being electrically joined, and said second AND gate output terminal being connected to said first input terminal of said OR logic gate.

14. A combination as in claim 13 wherein said second OR gate input is inhibited, said control circuit further including source means including first and second output terminals for respectively supplying thereto a first plurality of pulses and a second plurality of pulses in one-to-one correspondence with said first pulse plurality and delayed therefrom, and a second delay network; said first terminal of said pulse source connected to said second input terminal of said OR logic gate and said second input terminal of said first AND logic gate, and said second delay network connected between said inhibited input terminal of said second AND gate and said second terminal of said pulse source.

15. In combination in a magnetic control circuit, an OR logic gate comprising first and second input terminals and an output terminal, said second OR gate input terminal being inhibited, first and second delay networks, first and second AND logic gates each comprising first and second input terminals and an output terminal, said second input terminal of said second AND gate being inhibited, said first delay network being connected between said OR gate output terminal and said first input terminal of said first AND gate, said first input terminal of said second AND gate and said first input terminal of said first AND gate being electrically joined, said second AND gate output terminal being connected to said first input terminal of said OR logic gate, a first pulse source, a second pulse source which supplies pulses in one-to-one correspondence with the pulses of said first pulse source and delayed therefrom, said first pulse source connected to said second input terminal of said OR logic gate and said second input terminal of said first AND logic gate, said second delay network connected between said inhibited input terminal of said second AND gate and said responsive pulse source, and means for causing said second pulse source to supply a pulse in response to each pulse supplied by said first pulse source.

References Cited in the file of this patent

UNITED STATES PATENTS

| | | |
|---|---|---|
| 2,921,190 | Fowler | Jan. 12, 1960 |
| 3,027,464 | Kosonocky | Mar. 27, 1962 |
| 3,078,376 | Lewin | Feb. 19, 1963 |

OTHER REFERENCES

"Core Driver Error Check," in IBM Technical Disclosure Bulletin, vol. 2, No. 3, dated October 1959, page 24.

"Esaki Diode Latch Circuit" in IBM Technical Disclosure Bulletin, vol. 4, No. 3, dated August 1961, pages 81 and 82.